(12) United States Patent
Shim et al.

(10) Patent No.: US 8,182,131 B2
(45) Date of Patent: May 22, 2012

(54) LIGHT GUIDE PLATE AND BACKLIGHT UNIT HAVING THE SAME

(75) Inventors: Sung-Kyu Shim, Seoul (KR); In-Sung Hwang, Suwon-si (KR); Hyoung-Joo Kim, Uiwang-si (KR); Jae-Joong Kwon, Suwon-si (KR); Seung-In Baek, Seoul (KR)

(73) Assignee: Samsung Electronics Co., Ltd. (KR)

( * ) Notice: Subject to any disclaimer, the term of this patent is extended or adjusted under 35 U.S.C. 154(b) by 350 days.

(21) Appl. No.: 12/354,714

(22) Filed: Jan. 15, 2009

(65) Prior Publication Data

US 2009/0316433 A1   Dec. 24, 2009

(30) Foreign Application Priority Data

Jun. 19, 2008   (KR) .............................. 2008-0057978

(51) Int. Cl.
*F21V 7/04* (2006.01)
(52) U.S. Cl. ......... 362/625; 362/600; 362/615; 362/623
(58) Field of Classification Search .................. 362/615, 362/600, 609, 616, 619, 620, 623, 625, 626, 362/97.1–97.4, 31, 330, 339, 336, 337, 559, 362/561
See application file for complete search history.

(56) References Cited

U.S. PATENT DOCUMENTS

| | | | | |
|---|---|---|---|---|
| 5,598,280 A | * | 1/1997 | Nishio et al. | 349/57 |
| 5,779,337 A | * | 7/1998 | Saito et al. | 362/619 |
| 5,961,198 A | * | 10/1999 | Hira et al. | 362/621 |
| 6,074,069 A | * | 6/2000 | Chao-Ching et al. | 362/26 |
| 7,121,709 B2 | * | 10/2006 | Shinohara et al. | 362/606 |
| 7,374,329 B2 | * | 5/2008 | Feng et al. | 362/626 |
| 7,654,722 B2 | * | 2/2010 | Chen et al. | 362/619 |
| 7,887,227 B2 | * | 2/2011 | Parker et al. | 362/607 |
| 2003/0184993 A1 | * | 10/2003 | Yamada | 362/31 |
| 2003/0227768 A1 | * | 12/2003 | Hara et al. | 362/31 |
| 2005/0264717 A1 | | 12/2005 | Chien et al. | |
| 2006/0050531 A1 | * | 3/2006 | Tsuda | 362/609 |
| 2007/0274097 A1 | * | 11/2007 | Chen et al. | 362/609 |
| 2010/0157577 A1 | * | 6/2010 | Montgomery et al. | 362/97.2 |

FOREIGN PATENT DOCUMENTS

| | | |
|---|---|---|
| JP | 2003-295117 | 10/2003 |
| JP | 2006-173046 | 6/2006 |
| JP | 2007-134344 | 5/2007 |
| KR | 2003-0039600 | 5/2003 |
| WO | WO 2004/027492 | 4/2004 |

* cited by examiner

*Primary Examiner* — Anabel Ton
*Assistant Examiner* — Danielle Allen
(74) *Attorney, Agent, or Firm* — Innovation Counsel LLP

(57) ABSTRACT

In accordance with one or more embodiments of the present disclosure, a light guide plate includes a first light incident surface receiving a first external light, a second light incident surface receiving a second external light and opposite to the first light incident surface, a light exit surface connecting the first and second light incident surfaces to output the first and second external lights, a reflective surface reflecting the first and second external lights in opposition to the light exit surface, and optical path changing portions each of which having a first inclined surface and a second inclined surface. The optical path changing portions are provided on the reflective surface with a predetermined interval and recessed toward the light exit surface to reflect the first and second external lights to the light exit surface.

24 Claims, 15 Drawing Sheets

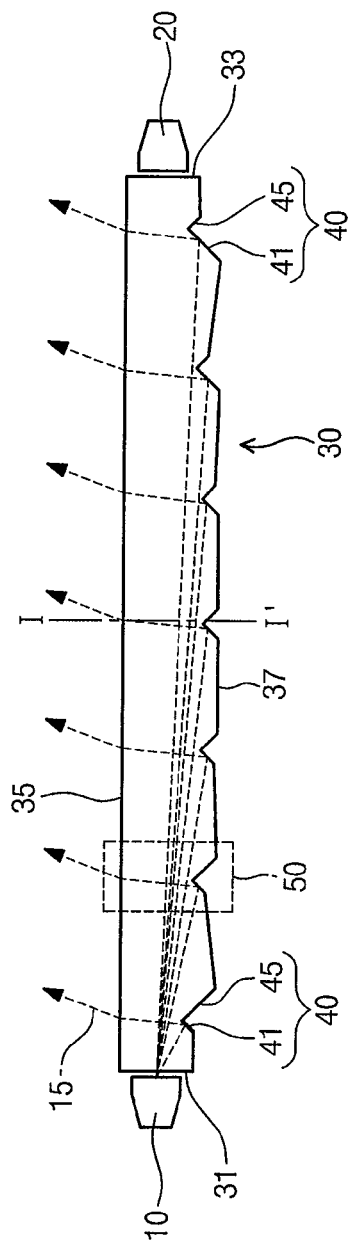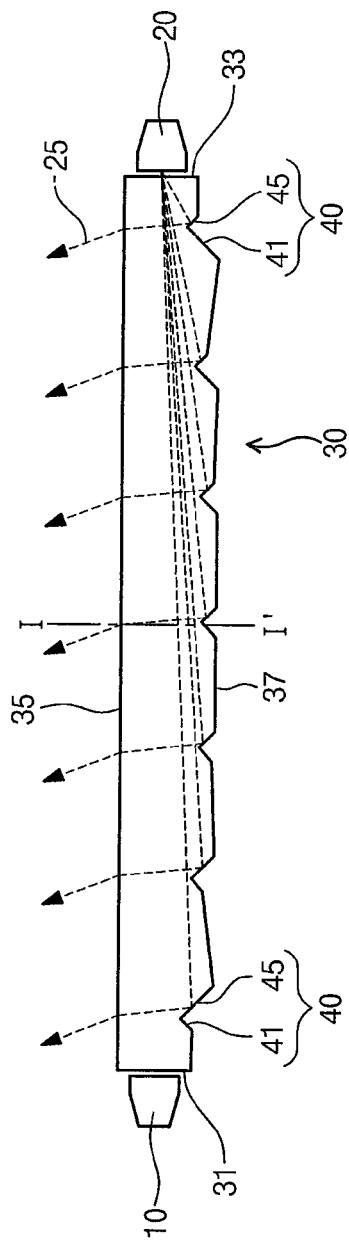

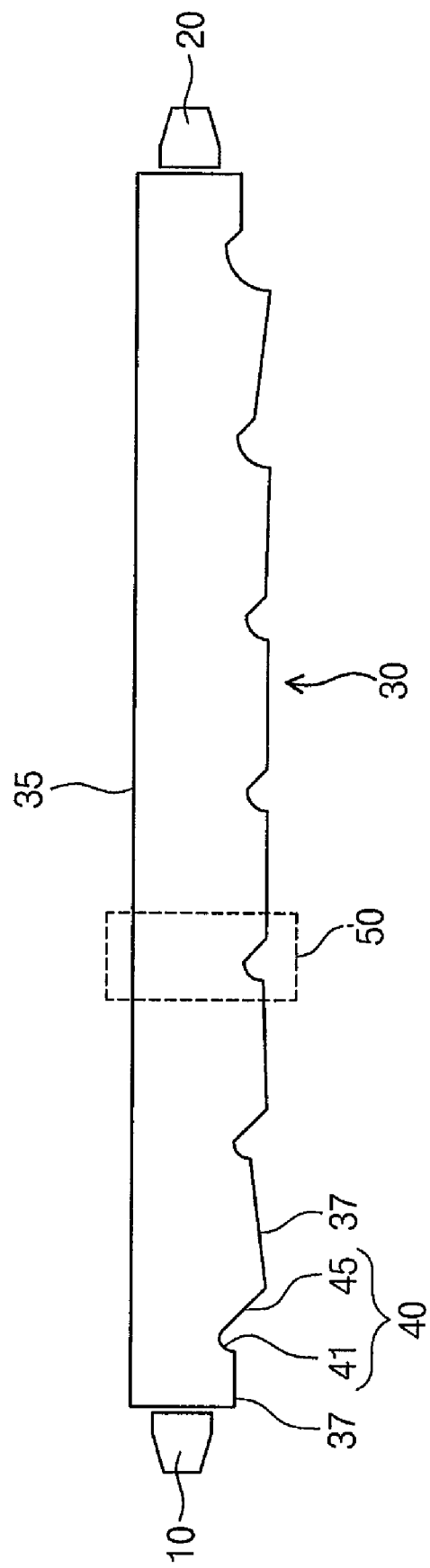

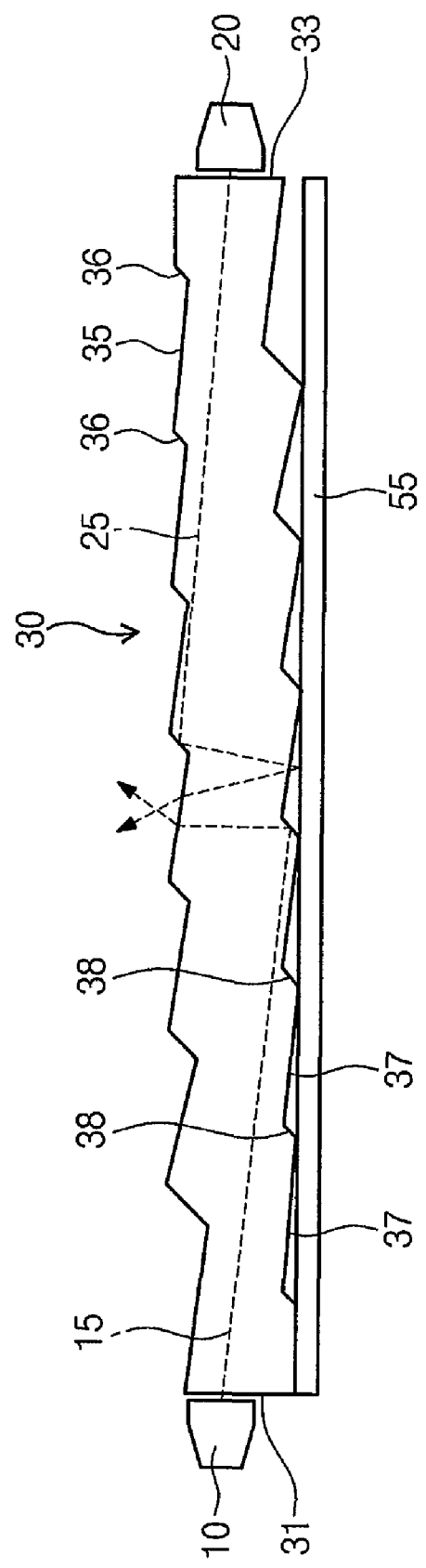

LIGHT GUIDE PLATE AND BACKLIGHT UNIT HAVING THE SAME

CROSS-REFERENCE TO RELATED APPLICATIONS

This application claims priority to and the benefit of Korean Patent Application No. 2008-57978, filed on Jun. 19, 2008, the contents of which are herein incorporated by reference in their entirety.

BACKGROUND

1. Technical Field

The present invention relates generally to a light guide plate and a backlight unit having the same and more particularly, for example, to a light guide plate having improved optical characteristics and a backlight unit having the light guide plate.

2. Related Art

Generally, liquid crystal display (LCD) devices are utilized for convenience and efficient characteristics, such as slimness, light weight, and low power consumption. The LCD includes a LCD panel that displays an image, a backlight unit that supplies a light to the LCD panel, and a driving circuit that applies a driving signal to the LCD panel.

The backlight unit may be classified as a direct illumination type backlight unit or as an edge illumination type backlight unit according to a position of a light source for the backlight unit. In the direct illumination type backlight unit, a plurality of light sources are provided below the LCD panel to directly supply a light to the LCD panel. In the edge illumination type backlight unit, a light source is provided adjacent to a side surface of the LCD panel to supply a light to the LCD panel by using a light guide plate.

Moreover, in the edge illumination type backlight unit, the light sources may be provided at both sides of the light guide plate to supply more light to the LCD panel. In this instance, the light guide plate may have a structure capable of uniformly supplying the light over the entire surface of the LCD panel.

SUMMARY

An exemplary embodiment of the present disclosure provides a light guide plate including a protrusion having asymmetric inclined surfaces. Another exemplary embodiment of the present disclosure provides a backlight unit including a light guide plate.

In an exemplary embodiment of the present disclosure, a light guide plate includes a first light incident surface, a second light incident surface, a light exit surface, a reflective surface, and a plurality of optical path changing portions. Each of the optical path changing portions includes a first inclined surface and a second inclined surface. The first light incident surface receives a first external light. The second light incident surface receives a second external light. The second light incident surface is opposite to the first light incident surface. The light exit surface connects the first light incident surface to the second light incident surface to output the first and second external lights. The reflective surface reflects the first and second external lights in opposition to the light exit surface.

In various implementations, the optical path changing portions are provided on the reflective surface with a predetermined interval and recessed toward the light exit surface to reflect the first and second external lights to the light exit surface. A width of the first inclined surface is increased as a distance from the first light incident surface increases for corresponding ones of the first inclined surfaces. A width of the second inclined surface is increased as a distance from the second light incident surface increases for corresponding ones of the second inclined surfaces. The second inclined surface is connected to the first inclined surface. The optical path changing portions are provided symmetrically to each other about a first reference line extending from a center of the light exit surface perpendicularly to the light exit surface.

In an exemplary embodiment, a first distance between an end of the first inclined surface connected to the reflective surface and the light exit surface is increased in a direction opposite to the first light incident surface. A second distance between an end of the second inclined surface connected to the reflective surface and the light exit surface is increased in a direction opposite to the second light incident surface. In this case, the first inclined surface is inclined at a first angle with respect to the light exit surface, the second inclined surface is inclined at a second angle with respect to the light exit surface, and the first angle is different from the second angle.

In another exemplary embodiment, a first distance between an end of the first inclined surface connected to the reflective surface and the light exit surface is decreased in a direction of the first light incident surface and the second light incident surface on a basis of the first reference line, and a second distance between an end of the second inclined surface connected to the reflective surface and the light exit surface is decreased in a direction of the first light incident surface and the second light incident surface on a basis of the first reference line. The first inclined surface is inclined at a first angle with respect to the light exit surface, the second inclined surface is inclined at a second angle with respect to the light exit surface, and the first angle is equal to the second angle.

In still another exemplary embodiment, a first distance between an end of the first inclined surface connected to the reflective surface and the light exit surface is increased in a direction of the first reference line in a first region between the first light incident surface and the first reference line, the first distance is constant in a second region between the first reference line and the second light incident surface, a second distance between an end of the second inclined surface connected to the reflective surface and the light exit surface is increased in a direction of the first reference line in the second region, the second distance being constant in the first region. The first inclined surface is inclined at a first angle with respect to the light exit surface, the second inclined surface is inclined at a second angle with respect to the light exit surface, and the first angle is different from the second angle. The first inclined surface is curved. In this case, a tangential line making contact with the first inclined surface forms an angle of about 24 degrees to about 65 degrees with respect to a second reference line parallel to the light exit surface.

In still another exemplary embodiment of the present disclosure, a backlight unit includes a first light source, a second light source, and a light guide plate. The first light source generates a first light. The second light source generates a second light. The light guide plate guides and emits the first and second lights. The light guide plate includes a first light incident surface, a second light incident surface, a light exit surface, a reflective surface, and a plurality of optical path changing portions. The first light incident surface receives the first light. The second light incident surface receives the second light. The second light incident surface is opposite to the first light incident surface. The light exit surface connects the first light incident surface to the second light incident surface to output the first and second lights. The reflective surface reflects the first and second external lights towards the light exit surface. The optical path changing portions are provided on the reflective surface with a predetermined interval and recessed toward the light exit surface to reflect the first and second lights to the light exit surface. In this case, each of the optical path changing portions includes a first inclined surface and a second inclined surface. A width of the first inclined surface is increased as a distance from the first light incident surface increases for corresponding ones of the first inclined surfaces. A width of the second inclined surface is increased as a distance from the second light incident surface increases for corresponding ones of the second inclined surfaces. The second inclined surface is connected to the first inclined surface.

In still another exemplary embodiment of the present disclosure, a backlight unit includes a first light source, a second light source, and a light guide plate. The first light source generates a first light. The second light source generates a second light. The light guide plate guides and emits the first and second lights. The light guide plate includes a first light incident surface, a second light incident surface, a light exit surface, and a reflective surface. The first light incident surface receives the first light. The second light incident surface receives the second light. The second light incident surface is opposite to the first light incident surface. The light exit surface connects the first light incident surface with the second light incident surface. The light exit surface has a concave-convex shape extending between the first and second light incident surfaces. A width of the light exit surface increases as a distance from the first light incident surface increases for corresponding ones of the first inclined surfaces. The reflective surface connects the first light incident surface with the second light incident surface in opposition to the light exit surface. The reflective surface has a convex-concave shape extending between the first and second light incident surfaces. A width of the reflective surface increases as a distance from the second light incident surface increases for corresponding ones of the second inclined surfaces. A reflective sheet may be provided below the light guide plate to reflect at least one of the first and second lights emitted from the reflective surface.

According to the above, the light guide plate includes the optical path changing portions to uniformly output lights incident from two light sources. The backlight unit includes the light guide plate having the optical path changing portions to output the lights incident from the two light sources in different directions. Accordingly, the lights having the same brightness may be supplied to users positioned in different directions.

BRIEF DESCRIPTION OF THE DRAWINGS

The above and other advantages of the present disclosure will become more readily apparent by reference to the following detailed description when considered in conjunction with the accompanying drawings wherein:

FIGS. 2A to 2C are sectional views showing a backlight unit according to the first exemplary embodiment of the present disclosure;

FIG. 9 is a sectional view showing a backlight unit according to a fourth exemplary embodiment of the present disclosure;

FIG. 11 is a sectional view showing a backlight unit according to a third exemplary embodiment of the present disclosure;

DETAILED DESCRIPTION

Figure 1:
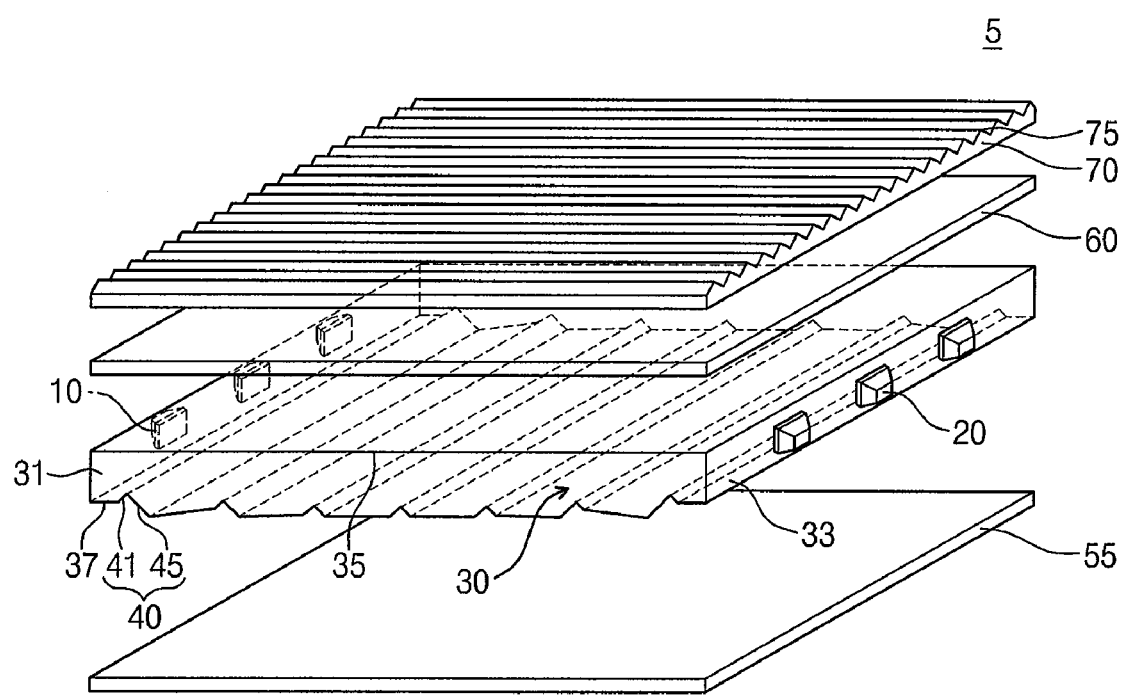
FIG. 1 is a perspective view showing a backlight unit according to a first exemplary embodiment of the present disclosure.

Hereinafter, exemplary embodiments of a light guide plate and a backlight unit having the same will be described with reference to accompanying drawings. Objects to be solved by the invention, means to solve the objects, and effects thereof will be readily understood to those skilled in the art through embodiments described with reference to accompanying drawings. It is understood that the present invention should not be limited to the following exemplary embodiments but various changes and modifications may be made by one ordinary skilled in the art within the spirit and scope of the present invention. Meanwhile, elements shown in the drawings may be simplified or magnified for the purpose of clear explanation. In addition, the same reference numerals are used to designate the same elements throughout the drawings.

FIG. 1 is a perspective view showing a backlight unit according to a first exemplary embodiment of the present disclosure. Referring to FIG. 1, a backlight unit 5 includes first light sources 10, second light sources 20, a light guide plate 30, a reflective sheet 55, a diffusion sheet 60, and a prism sheet 70.

The first light sources 10 are provided at one side of the light guide plate 30. The first light sources 10 generate first lights 15 (refer to FIG. 2A) to supply the first lights 15 to the light guide plate 30. In the present exemplary embodiment, each of the first light source 10 may include a cold cathode fluorescent lamp (CCFL), an external electrode fluorescent lamp (EEFL), or a light emitting diode (LED).

The second light sources 20 are provided at the other side of the light guide plate 30 while facing the first light sources 10. The second light sources 20 generate second lights 25 (refer to FIG. 2B) to supply the second lights to the light guide plate 30. In the present exemplary embodiment, the second light source 20 may include the CCFL, the EEFL, or the LED.

The light guide plate 30 is interposed between the first light sources 10 and the second light sources 20. The light guide plate 30 may include at least one of acryl, poly methyl meta acrylate (PMMA), polycarbonate (PC), and polymethacrylstyrene (MS). The light guide plate 30 guides the first lights 15 and the second lights 25 to output the first lights 15 and the second lights 25 through an upper surface thereof. The light guide plate 30 includes a first light incident surface 31, a second light incident surface 33, a light exit surface 35, and a reflective surface 37.

The first light incident surface 31 is the side surface of the light guide plate 30, to which faces the first light sources 10. The first lights 15 emitted from the first light sources 10 are incident onto the first light incident surface 31.

The second light incident surface 33 is the other surface of the light guide plate 30 which faces the second light sources 20 in opposition to the first light incident surface 31. The second lights 25 emitted from the second light sources 20 are incident onto the second light incident surface 33.

The light exit surface 35 connects an upper portion of the first light incident surface 31 to an upper portion of the second light incident surface 33. The light exit surface 35 has substantially planar shape. The light exit surface 35 outputs the first and second lights 15 and 25.

The reflective surface 37 is provided in opposition to the light exit surface 35, and connects a lower portion of the first light incident surface 31 to a lower portion of the second light incident surface 33. The reflective surface 37 reflects the first and second lights 15 and 25. The reflective surface 37 includes plural optical path changing portions 40 reflecting the first and second lights 15 and 25 to the light exit surface 35.

The optical path changing portions 40 are provided on the reflective surface 37 in parallel to the first light incident surface 31 and the second light incident surface 33. The details of the optical path changing portions 40 will be given later with reference to FIGS. 2A to 4.

The reflective sheet 55 is provided below the light guide plate 30, and includes a material having a higher reflective index. For example, the reflective sheet 55 may be formed by coating the material, such as aluminum (Al), or silver (Ag), having the higher reflective index on a base material. The reflective sheet 55 reflects a light, which is emitted downward from the light guide plate 30, toward the light guide plate 30 to reduce light loss.

The diffusion sheet 60 is above the light guide plate 30. The diffusion sheet 60 diffuses and emits a light supplied from the light guide plate 30. The prism sheet 70 is provided above the diffusion sheet 60. The prism sheet 70 enhances the brightness of the light supplied through the diffusion sheet 60 by using a prism 75 formed on an upper surface thereof. In this case, the prism 75 may extend perpendicularly to the first light incident surface 31 and the second light incident surface 33.

Figure 2C:
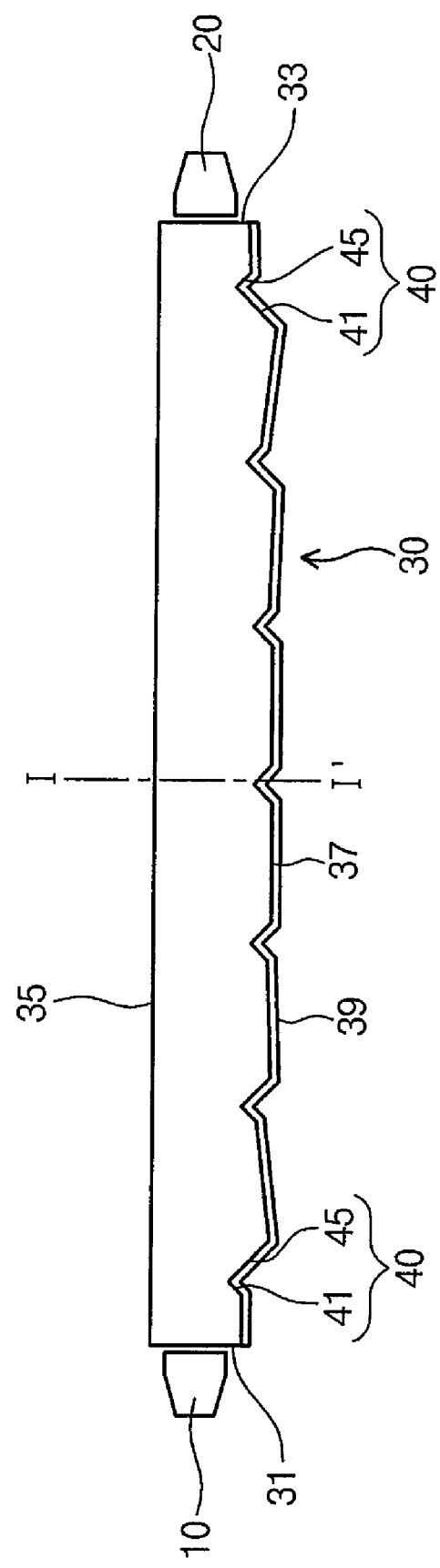
Figure 3:
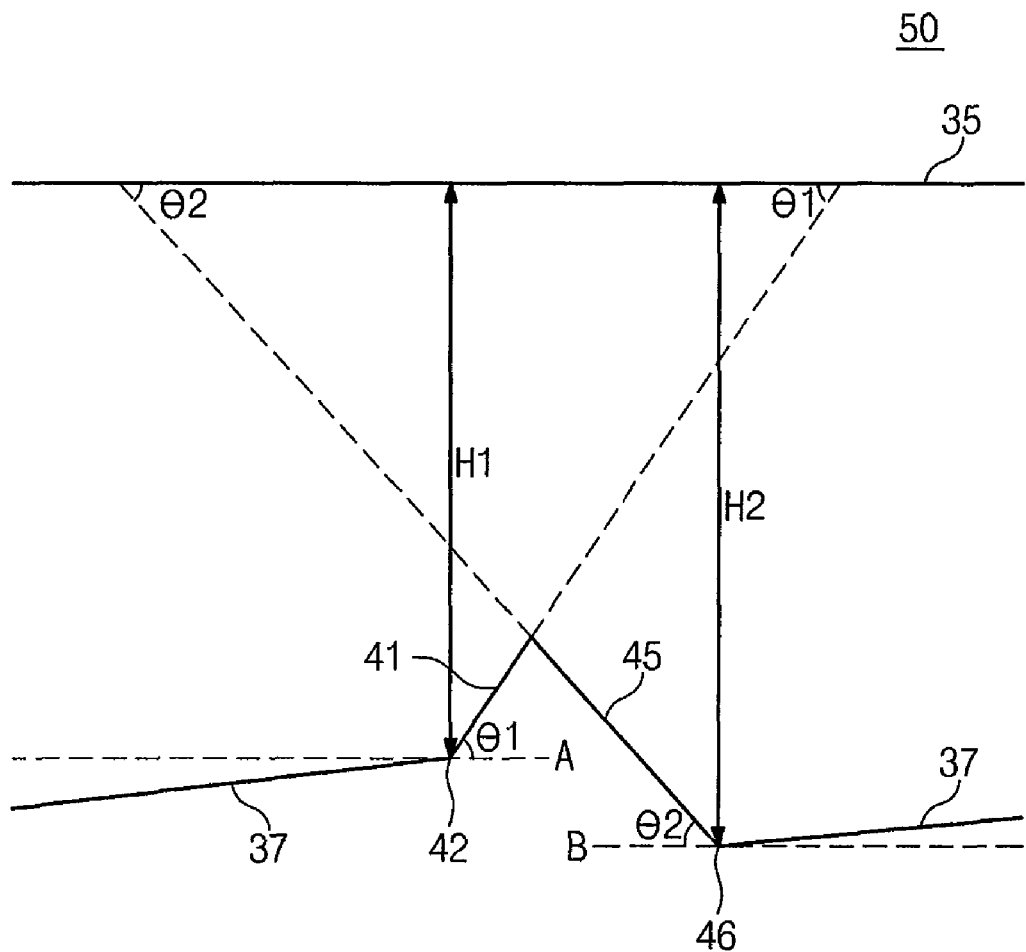
FIG. 3 is a partially enlarged view showing an optical path changing portion shown in FIG. 2A.
Figure 4:
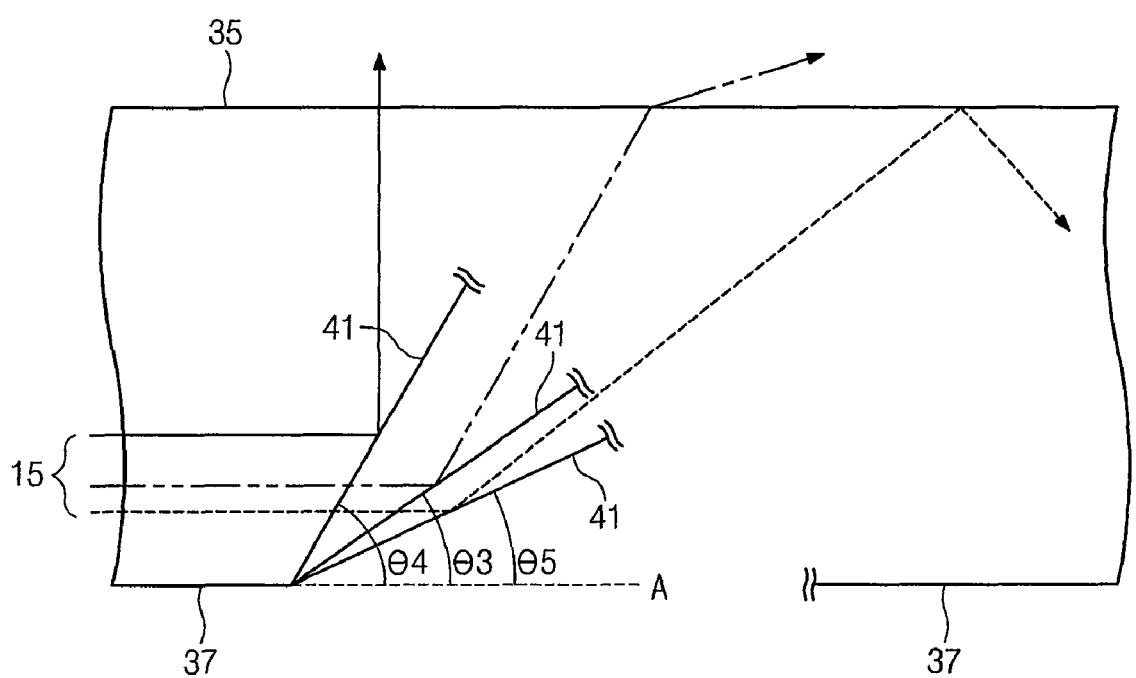
FIG. 4 is a sectional view showing an angle of an optical path changing portion shown in FIG. 1.

Hereinafter, various light guide plates according to exemplary embodiments will be described in detail with reference to FIGS. 2A to 11. FIGS. 2A to 2C are sectional views showing the backlight unit 5 according to the first exemplary embodiment of the present disclosure, and FIG. 3 is a partially enlarged view showing the optical path changing portion shown in FIG. 2A. FIG. 4 is a sectional view showing an angle of the optical path changing portion shown in FIG. 1. In FIGS. 2A to 2C, the same reference numerals denote the same elements in FIG. 1, and thus the detailed description of the same elements will be omitted.

Referring to FIGS. 2A to 2C, 3, and 4, the backlight unit 5 includes the first light sources 10, the second light source 20, and the light guide plate 30. The light guide plate 30 includes the first light incident surface 31, the second light incident surface 33, the light exit surface 35, the reflective sheet 37, and the optical path changing portions 40.

The optical path changing portions 40 are provided on the reflective sheet 37 with a predetermined interval. For the convenience of explanation, one of the optical path changing portions 40 will be representatively described.

The optical path changing portion 40 may be recessed from the reflective surface 37 toward the light exit surface 35. For example, the optical path changing portion 40 may have a prism shape. The optical path changing portion 40 includes a first inclined surface 41 reflecting the first light 15 in a first light exit direction and a second inclined surface 45 connected with the first inclined surface 41 to reflect the second light 25 in a second light exit direction.

The first inclined surface 41 is formed on the reflective surface 37 such that the first light 15 is uniformly output through the light exit surface 35. The width of the first inclined surface 41 is increased as the first inclined surface 41 is away from the first light incident surface 31 (i.e., the width of the first inclined surface 41 increases as the distance from the first light incident surface 31 increases for corresponding ones of the first inclined surface 41). For example, the first inclined surface 41 adjacent to the first light incident surface 31 is narrower than the first inclined surface 41 adjacent to the second light incident surface 33. Accordingly, an area capable of reflecting the first light 15 is increased as the first inclined surface 41 is away from the first light incident surface 31.

The second inclined surface 45 is formed on the reflective surface 37 such that the second light 25 is uniformly output through the light exit surface 35. The width of the second inclined surface 45 is increased as the second inclined surface 45 is away from the second light incident surface 33 (i.e., the width of the second inclined surface 45 increases as the distance from the second light incident surface 33 increases for corresponding ones of the second inclined surface 45). For example, the second inclined surface 45 adjacent to the second light incident surface 33 is narrower than the second inclined surface 45 adjacent to the first light incident surface 31. An area of the second inclined surface 45 capable of reflecting the second light 25 is increased as the second inclined surface 45 is away from the second light incident surface 33.

The first light 15 and the second light 25 are uniformly output throughout the whole area of the light exit surface 35. After the first light 15 and the second light 25 are incident through the first light incident surface 31 and the second light incident surface 33, the first light 15 and the second light 25 exit through the light exit surface 35 in a uniform direction. Accordingly, the first light 15 and the second light 25 may be effectively recognized by users located in different directions. In addition, the first light 15 and the second light 25 may be used to represent a three-dimensional image.

The optical path changing portions 40 may be arranged symmetrically to each other about a first reference line I-I' extending in a direction perpendicular to the light exit surface 35 and positioned at the central portion of the light exit surface 35. However, the optical path changing portions 40 are not limited thereto.

The light guide plate 30 may include a reflective film 39 coated on a rear surface of the reflective surface 37 and the optical path changing portion 40. The reflective film 39 includes aluminum (Al) and silver (Ag).

Each of the first and second inclined surfaces 41 and 45 includes a first end 42 and a second end 46, which are connected to the reflective surface 37. The first end 42 and the second end 46 are spaced apart from the light exit surface 35 by a first distance H1 and a second distance H2, respectively. The first distance H1 and the second distance H2 may have different values. However, if the optical path changing portions 40 are positioned on the first reference line I-I', the first distance H1 is equal to the second distance H2.

The first inclined surface 41 and the second inclined surface 45 are inclined at a first angle θ1 and a second angle θ2 with respect to a first virtual line A and a second virtual line B extending in parallel to the light exit surface 35, respectively. In this case, the first angle θ1 may be different from the second angle θ2 except when the optical path changing portion 40 is positioned on the first reference line I-I'.

The first inclined surface 41 and the second inclined surface 45 are inclined at a predetermined angle to adjust light exit angles of the first light 15 and the second light 25. For the convenience of the explanation, the first inclined surface 41 shown in FIG. 4 will be representatively described.

The first inclined surface 41 may be inclined at a third angle θ3 to a fourth angle θ4 with respect to the first virtual line A extending in parallel to the light exit surface 35. For example, the first inclined surface 41 may be inclined at about 24 degrees to about 45 degrees. If the first inclined surface 41 is inclined at about 45 degrees, the first light 15 incident onto the first inclined surface 41 is reflected perpendicularly to the light exit surface 35. In addition, if the first inclined surface 41 is inclined at about 24 degrees, the first light 15 reflected from the first inclined surface 41 exits while being inclined at a predetermined angle with respect to the light exit surface 35.

If the first inclined surface 41 is inclined at a fifth angle θ5 less than about 24 degrees, the first light 15 is reflected from the light exit surface 35, so that the first light 15 does not exit to an exterior. In addition, if the first inclined surface 41 is inclined at a predetermined angle exceeding about 45 degrees, the first light 15 exits in a direction similar to the light exit direction of the second light 25.

The third angle θ3 may be changed according to a refractive index of a material forming the light guide plate 30. In other words, the minimum angle of the first inclined surface 41, which reflects the first light 15 such that the first light 15 exits, may be changed according to the refractive index of the material. For example, if the light guide plate 30 includes polycarbonate (PC), the first inclined surface 41 may be inclined at the third angle θ3 of about 25.5 degrees. In addition, if the light guide plate 30 includes methacrylstyrene (MS), the first inclined surface 41 may be inclined at the third angle θ3 in the range of about 24 degrees to about 25.5 degrees. If the light guide plate 30 includes polymethyl methacrylate (PMMA), the first inclined surface 41 may be inclined at the third angle θ3 of about 24 degrees.

Figure 5:
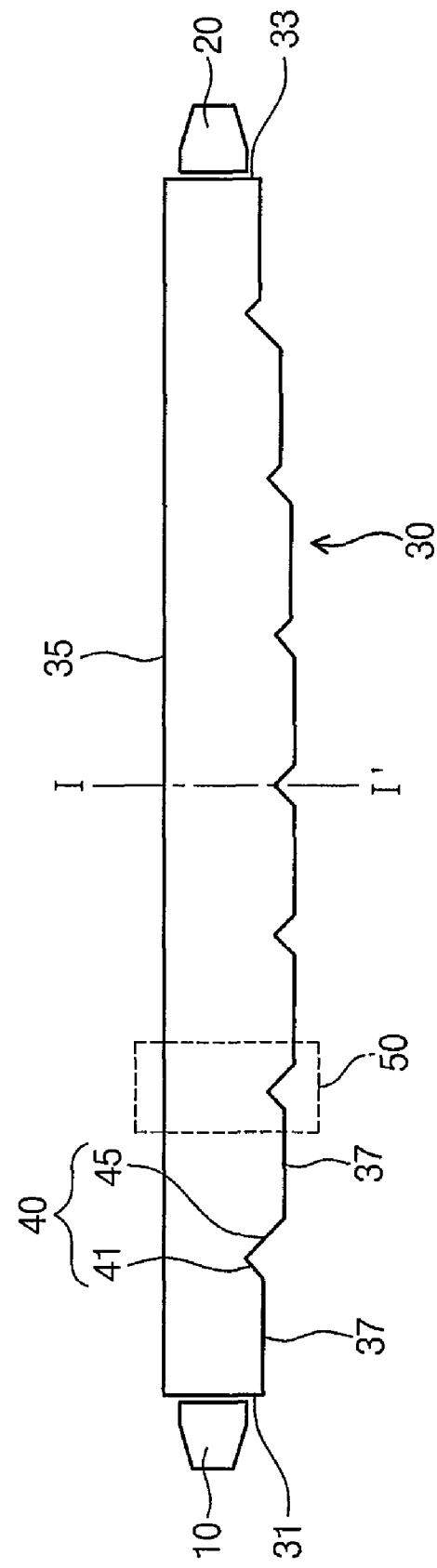
FIG. 5 is a sectional view showing a backlight unit according to a second exemplary embodiment of the present disclosure.
Figure 6:
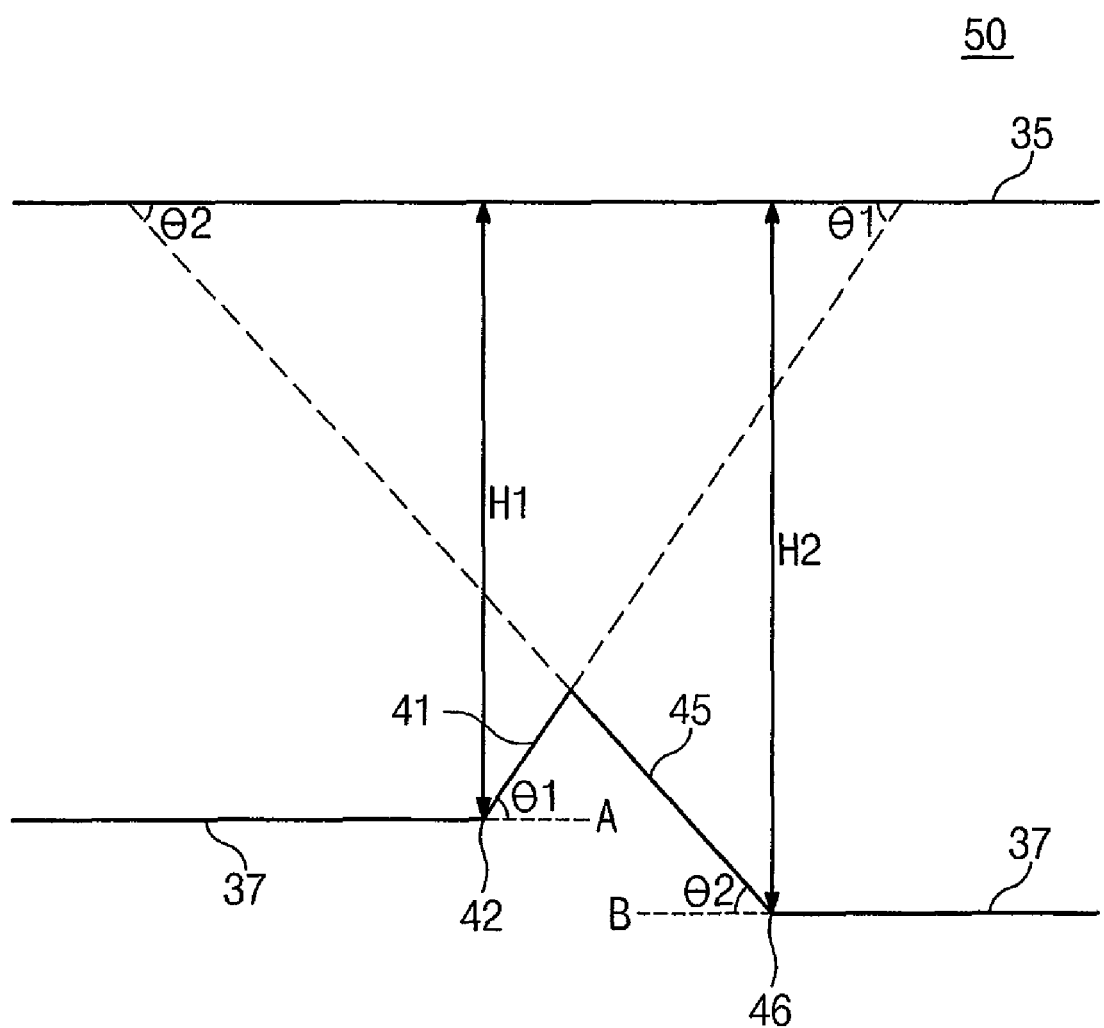
FIG. 6 is a partially enlarged view showing an optical path changing portion shown in FIG. 5.

FIG. 5 is a sectional view showing a backlight unit according to a second exemplary embodiment of the present disclosure. FIG. 6 is a partially enlarged view showing an optical path changing portion shown in FIG. 5.

Referring to FIGS. 5 and 6, the backlight unit includes first light sources 10, second light sources 20, and a light guide plate 30. The light guide plate 30 includes a first light incident surface 31, a second light incident surface 33, a light exit surface 35, a reflective surface 37, and a plurality of optical path changing portions 40. In the present exemplary embodiment, elements that have been described with reference to FIGS. 2A to 4 will be omitted to avoid redundancy, and one of the optical path changing portions 40 will be representatively described.

The optical path changing portion 40 is recessed from the reflective surface 37. The optical path changing portion 40 includes a first inclined surface 41 and a second inclined surface 45 connected to the reflective surface 37. The optical path changing portions 40 may be provided symmetrically to each other about a first reference line I-I' corresponding to the central portion of the light exit surface 35.

The first inclined surface 41 includes a first end 42 connected to the reflective surface 37, and the second inclined surface 45 includes a second end 46 connected to the reflective surface 37. A first distance H1 from the first end 42 to the light exit surface 35 is gradually reduced in the direction of the first light incident surface 31 and the second light incident surface 33 on the basis of the first reference line I-I'. In addition, a second distance H2 from the second end 46 to the light exit surface 35 is also gradually reduced in the direction of the first light incident surface 31 and the second light incident surface 33 on the basis of the first reference line I-I'.

The first inclined surface 41 and the second inclined surface 45 are inclined at a first angle θ1 and a second angle θ2 with respect to a first virtual line A and a second virtual line B extending from the reflective surface 37 in parallel to the first inclined surface 41 and the second inclined surface 45, respectively. The first angle θ1 may be equal to the second angle θ2. The reflective surface 37 connected to the first inclined surface 41 and the second inclined surface 45 may be substantially parallel to the light exit surface 35.

Figure 7:
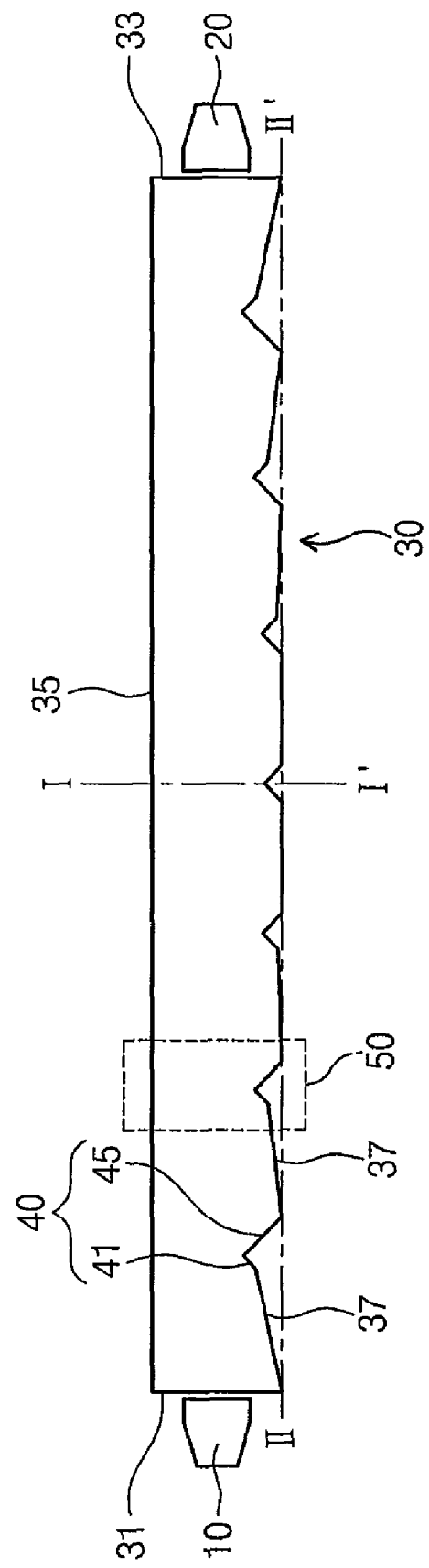
FIG. 7 is a sectional surface showing a backlight unit according to a third exemplary embodiment of the present disclosure.
Figure 8:
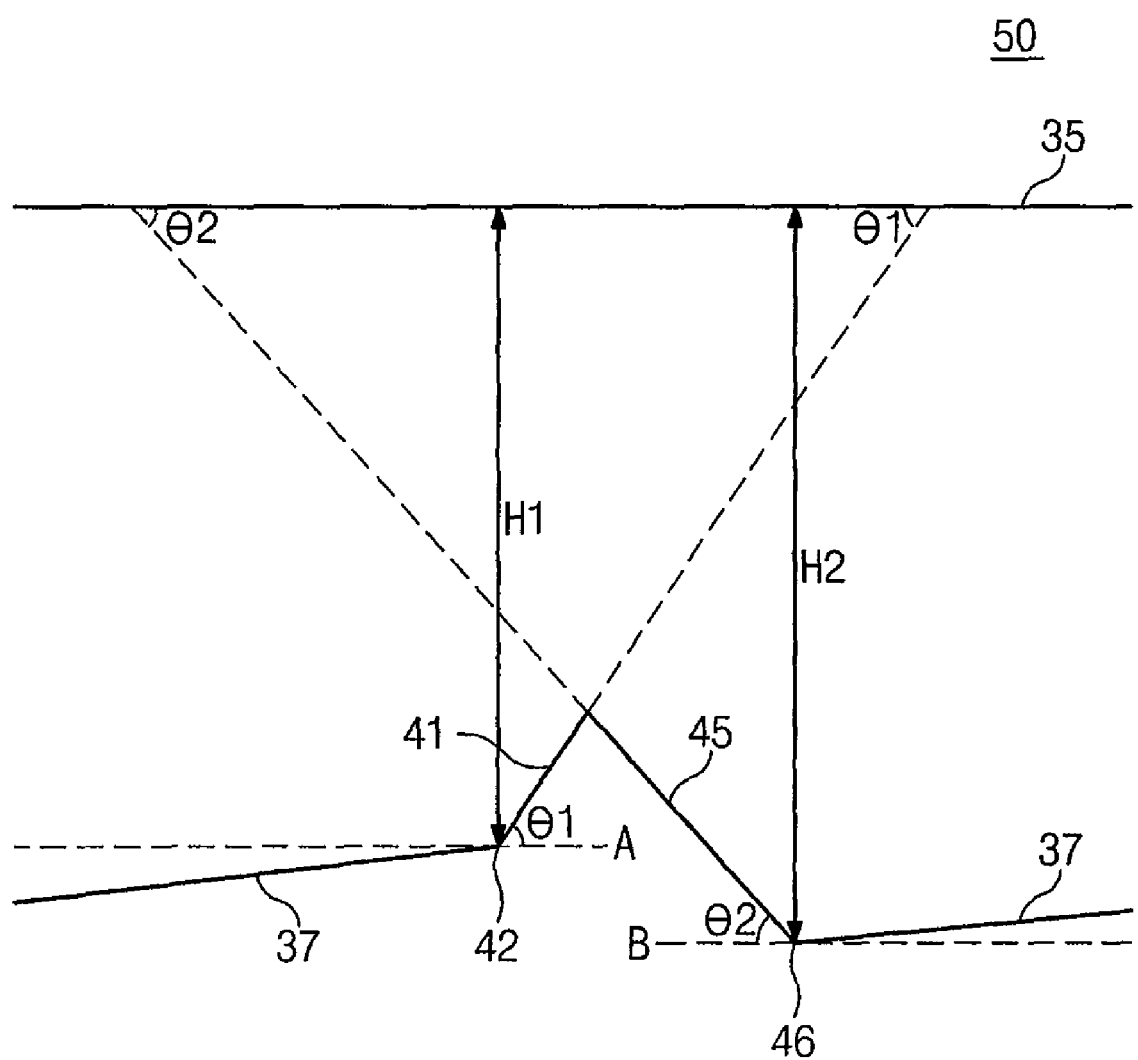
FIG. 8 is a partially enlarged view showing an optical path changing portion shown in FIG. 7.

FIG. 7 is a sectional surface showing a backlight unit according to a third exemplary embodiment of the present disclosure, and FIG. 8 is a partially enlarged view showing an optical path changing portion shown in FIG. 7. Referring to FIGS. 7 and 8, the backlight unit includes first light sources 10, second light sources 20, and a light guide plate 30. The light guide plate 30 includes a first light incident surface 31, a second light incident surface 33, a light exit surface 35, a reflective surface 37, and a plurality of optical path changing portions 40. In the present exemplary embodiment, elements that have been described with reference to FIGS. 2A to 4 will be omitted to avoid redundancy, and one of the optical path changing portions 40 will be representatively described.

The optical path changing portion 40 is recessed from a second reference line II-II' toward the light exit surface 35, which extend in parallel to the light exit surface 35 corresponding to ends of the first light incident surface 31 and the second light incident surface 33. The reflective surface 37 connects the optical path changing portions 40 to each other, and has a contact point with the second reference line II-II'. For example, the optical path changing portion 40 may be formed by partially recessing the reflective surface 37 of the light guide plate 30 having a predetermined thickness.

The optical path changing portion 40 includes a first inclined surface 41 and a second inclined surface 45 connected to the reflective surface 37. The optical path changing portions 40 may be provided symmetrically to each other about a first reference line I-I' corresponding to the central portion of the light exit surface 35.

The first inclined surface 41 includes a first end 42 connected to the reflective surface 37, and the second inclined surface 45 includes a second end 46 connected to the reflective surface 37. A first distance H1 between the first end 42 and the light exit surface 35 is increased in a direction of the first reference line I-I' in the region between the first reference line I-I' and the first light incident surface 31. The first distance H1 is constant with respect to the first inclined surface 41 of the optical path changing portion 40 located in the region between the first reference line I-I' and the second light incident surface 33. A second distance H2 between the second end 46 and the light exit surface 35 is increased in the direction of the first reference line I-I' in the region between the first reference line I-I' and the second light incident surface 33. The second distance H2 is constant with respect to the second inclined surface 45 of the optical path changing portion 40 located between the first reference line I-I' and the first light incident surface 31. Although the first distance H1 and the second distance H2 shown in FIG. 8 are obtained based on the optical path changing portion 40 located between the first light incident surface 31 and the first reference line I-I', the present disclosure is not limited thereto.

Figure 10A:
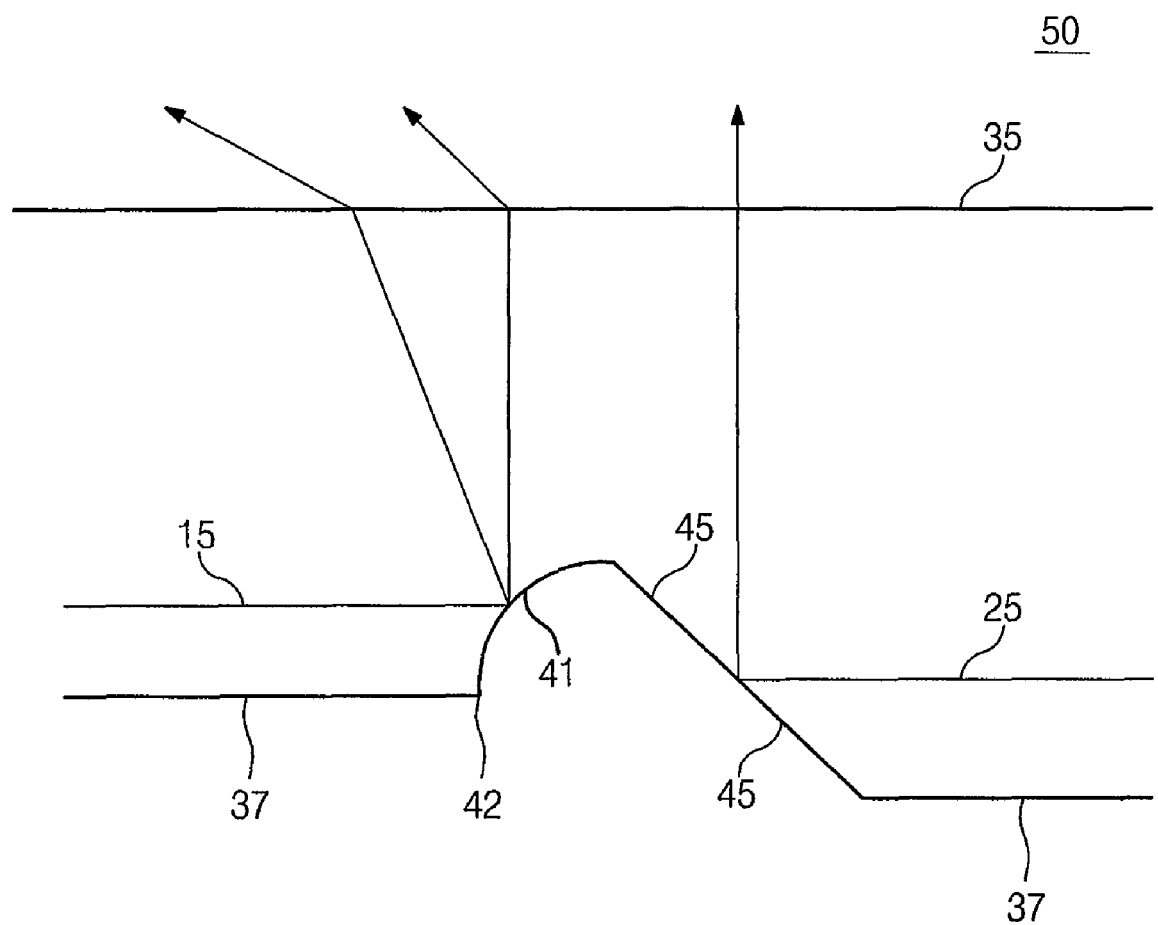
FIGS. 10A and 10B are partially enlarged views showing an optical path changing portion shown in FIG. 9.
Figure 10B:
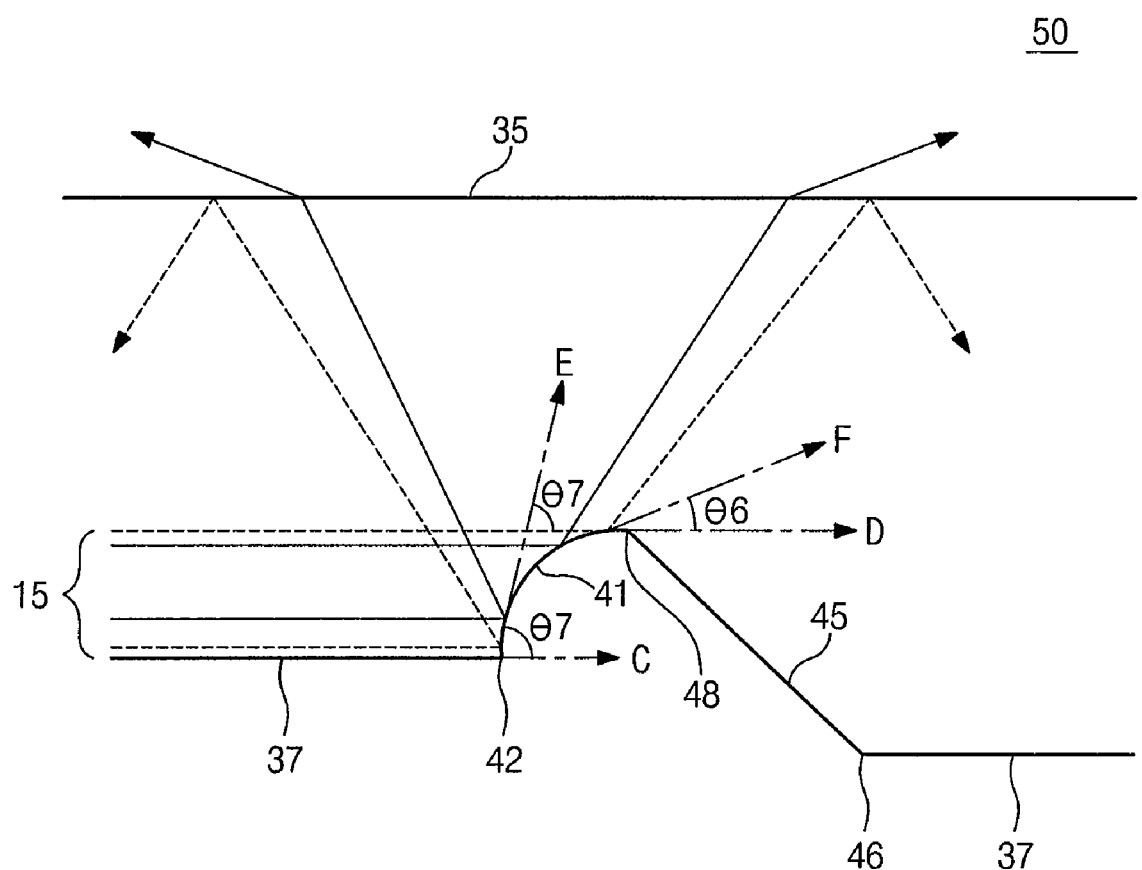

FIG. 9 is a sectional view showing a backlight unit according to a fourth exemplary embodiment of the present disclosure. FIGS. 10A and 10B are partially enlarged views showing an optical path changing portion shown in FIG. 9.

Referring to FIGS. 9, 10A, and 10B, the backlight unit includes first light sources 10, second light sources 20, and a light guide plate 30. The light guide plate 30 includes a first light incident surface 31, a second light incident surface 33, a light exit surface 35, a reflective surface 37, and a plurality of optical path changing portions 40. In the present exemplary embodiment, elements that have been described with reference to FIGS. 2A to 4 will be omitted to avoid redundancy, and one optical path changing portions 40 will be representatively described.

The optical path changing portion 40 includes a first inclined surface 41 and a second inclined surface 45 connected to the reflective surface 37. The first inclined surface 41 is curved, and the width of the first inclined surface 41 is increased as the first inclined surface 41 is away from the first light incident surface 31. The second inclined surface 45 is a flat surface, and the width of the second inclined surface 45 is increased as the second inclined surface 45 is away from the second light incident surface 33. Each of the first inclined surface 41 and the second inclined surface 45 includes a first end 42 and a second end 46 connected to the reflective surface 37, respectively. In addition, the first inclined surface 41 and the second inclined surface 45 are connected to a third end 48.

The first inclined surface 41 may reflect a first light 15, which is incident onto one point, at a predetermined angle. For example, the curved first inclined surface 41 may reflect the first light 15 incident onto one point through a plurality of optical paths. To this end, the first inclined surface 41 is curved such that the first light 15 may be reflected at predetermined angles with respect to a third extension line C and a fourth extension line D, in which the third extension line C extends from the first end 42 in parallel to the light exit surface 35, and the fourth extension line D extends from the third end 48 in parallel to the light exit surface 35. For example, the first inclined surface 41 may be formed such that a first tangential line E in contact with the first end 42 is inclined at an angle of about 65 degrees or less with respect to the third extension line C. In addition, the first inclined surface 41 may be formed such that a second tangential line F in contact with the third end 48 is inclined at an angle of 24 degrees or more with respect to the fourth extension line D. That is, the first inclined surface 41 may be curved such that a tangential line may be formed within the range of an angle of about 24 degrees to about 65 degrees.

The second inclined surface 45 may reflect the second light 25, which is incident onto one point, at a single angle. For example, the second inclined surface 45 having a flat surface may reflect the second light 25 incident onto one point through a single path. The second inclined surface 45 may be inclined at an angle of about 24 degrees to about 65 degrees.

Accordingly, the optical path changing portion 40 may supply light at different viewing angles by using the first inclined surface 41 and the second inclined surface 45. For example, the first inclined surface 41 reflects the first light 15 in a relatively wide angle range to provide a wide viewing angle, and the second inclined surface 45 reflects the second light 25 in a relatively narrow angle range to provide a narrow viewing angle.

FIG. 11 is a sectional view showing a backlight unit according to a fifth exemplary embodiment of the present disclosure. Referring to FIG. 11, the backlight unit includes first light sources 10, second light sources 20, a light guide plate 30, and a reflective sheet 55. The light guide plate 30 includes a first light incident surface 31, a second light incident surface 33, a light exit surface 35, and a reflective surface 37. In the present exemplary embodiment, elements that have been described with reference to FIG. 1 will be omitted to avoid redundancy.

In one embodiment, the reflective surface 37 includes a third inclined surface 38 reflecting a first light 15 to form a concave-convex shape. The width of the third inclined surface 38 is increased as the third inclined surface 38 is away from the first light incident surface 31. The third inclined surface 38 reflects the first light 15 to the light exit surface 35. The first light 15 is refracted on the light exit surface 35 and exits through the light exit surface 35. (I.e., the reflective surface 37 having a plurality of third inclined surfaces 38 that reflect the first light 15, wherein a width of the third inclined surface 38 increases as a distance from the first incident light surface 31 increases for corresponding ones of the third inclined surfaces 38.)

In one embodiment, the light exit surface 35 includes a fourth inclined surface 36 reflecting a second light 25 to form a concave-convex shape. As the fourth inclined surface 36 is away from the second light incident surface 33, the width of the fourth inclined surface 36 is increased. The fourth inclined surface 36 reflects the second light 25 to the reflective surface 37. The second light 25 exits from the reflective surface 37 and is reflected by the reflective sheet 55. (I.e., the light exit surface 35 comprises a plurality of fourth inclined surfaces 36 that reflect the second light 25, wherein a width of the fourth inclined surface 36 decreases as a distance from the first incident light surface 31 increases for corresponding ones of the fourth inclined surfaces 36.)

The reflective sheet 55 is provided below the light guide plate 30. The reflective sheet 55 reflects the second light 25 supplied from the reflective surface 37 to the light exit surface 35. The second light 25 is refracted on the light exit surface 35 and exits from the light exit surface 35.

Figure 12A:
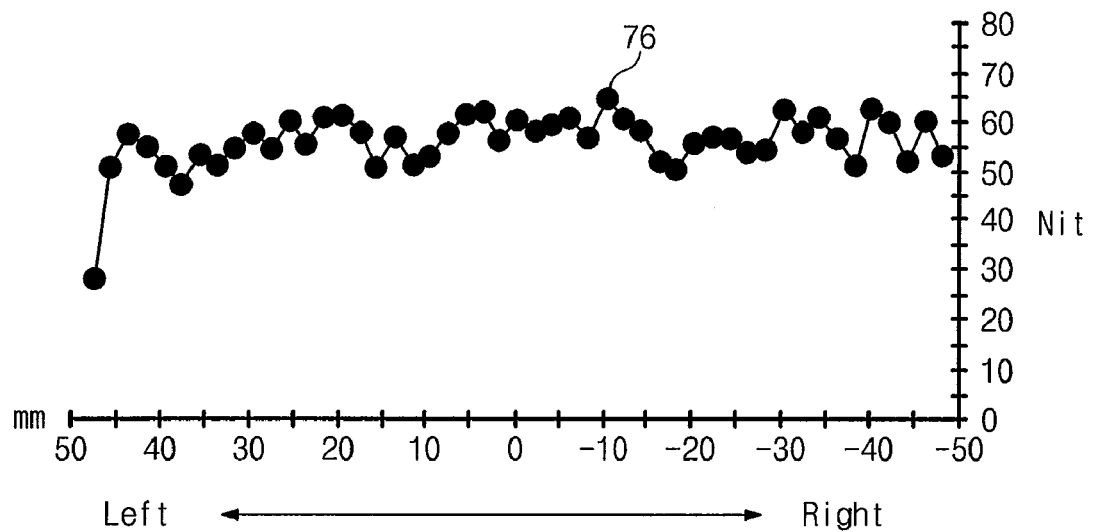
FIGS. 12A to 12C are graphs showing a light guide characteristic of a backlight unit including a light guide plate shown in FIG. 5.

Hereinafter, a light guide characteristic and a light radiation characteristic of the backlight unit according to one or more embodiments of the present disclosure will be described with reference to FIGS. 12A to 13. FIGS. 12A to 12C are graphs showing the light guide characteristic of the backlight unit including the light guide plate shown in FIG. 5, and FIG. 13 is a graph showing the light radiation characteristic of the backlight unit including the light guide plate shown in FIG. 5.

Figure 12B:
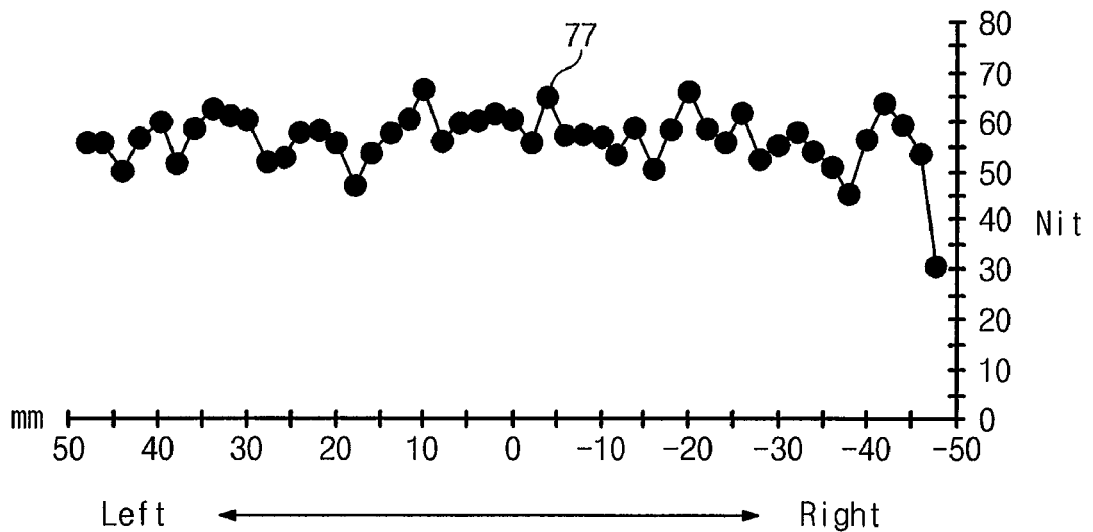
Figure 12C:
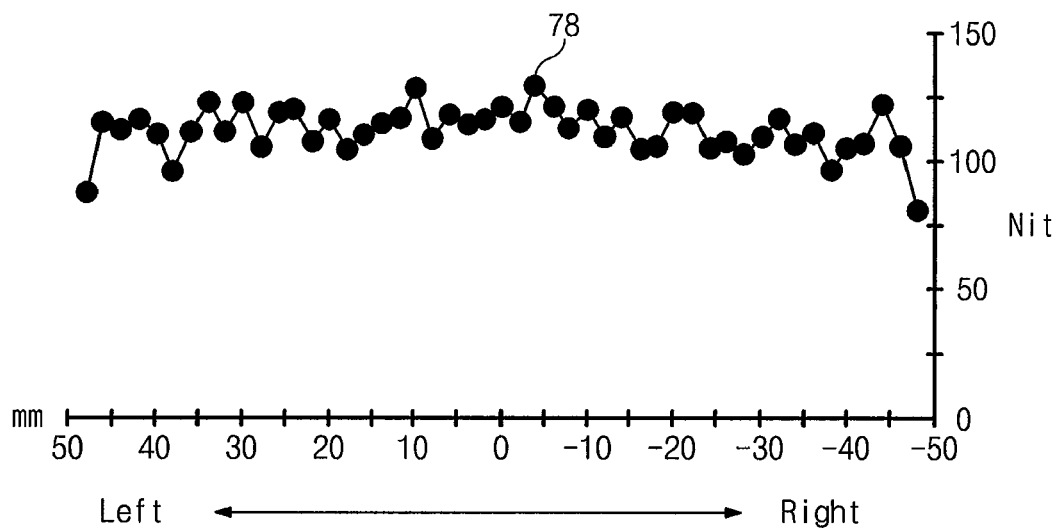
Figure 13:
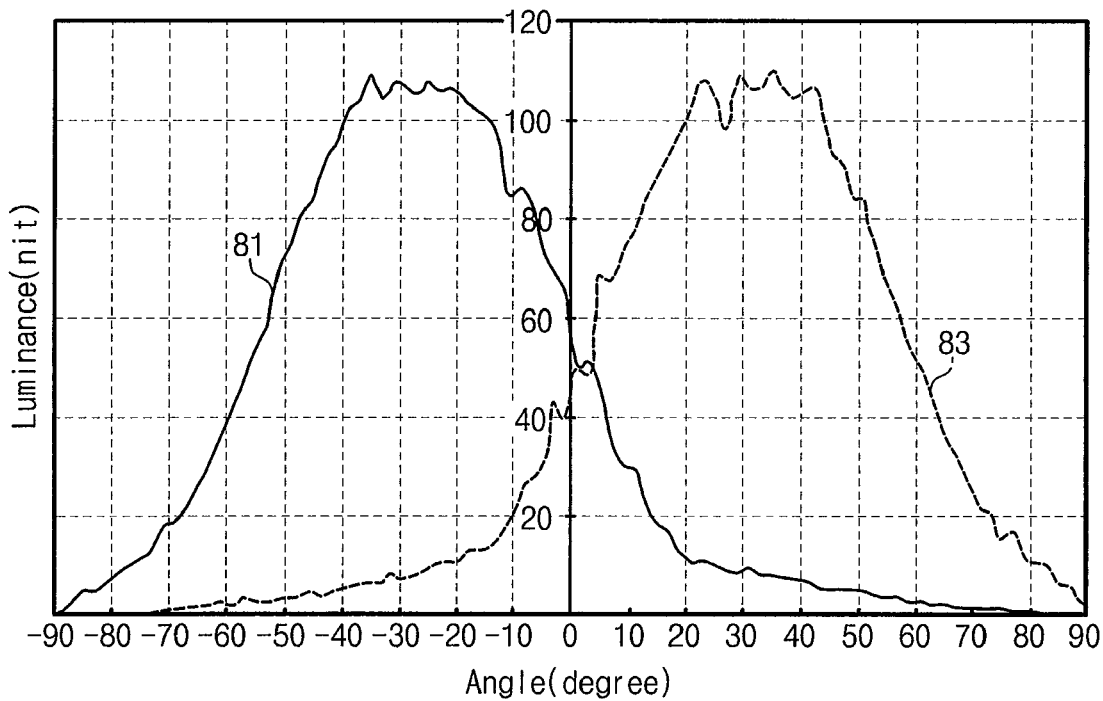
FIG. 13 is a graph showing a light radiation characteristic of a backlight unit including a light guide plate shown in FIG. 5.

FIGS. 12A to 13 are graphs showing the light guide characteristic and the light radiation characteristic of the backlight unit, which are measured through simulation using the light guide plate, the first and second light sources provided at both sides of the light guide plate, and the reflective sheet provided below the light guide plate. The light guide plate has a length of 100 mm and a width of 50 mm. In addition, 100 optical path changing portions are provided on the light guide plate with an interval of 1 mm. In this case, the thickness of the light guide plate is not taken into consideration.

A horizontal axis shown in FIGS. 12A to 12C represents the length of the light guide plate, and a vertical axis represents the brightness of a light exiting from the light guide plate. The unit of the length is millimeter, and the unit of the brightness is nit. In addition, "0" on the horizontal axis represents the center of the light guide plate in a longitudinal direction, positive values on the horizontal axis represent a left side with respect to the center of the light guide plate, and negative values on the horizontal axis represent a right side with respect to the center of the light guide plate.

FIG. 12A shows a brightness characteristic 76 of the first light output when the first light source provided at the left side of the light guide plate supplies the first light to the light guide plate. The brightness characteristic 76 of the first light shows that the first light is uniformly output even through the first light is distanced from the first light source.

FIG. 12B shows a brightness characteristic 77 of the second light output when the second light source provided at the right side of the light guide plate supplies the second light to the light guide plate. The brightness characteristic 77 of the second light shows that the second light is uniformly output even through the second light is distanced from the second light source.

FIG. 12C shows a brightness characteristic 78 of the first and second lights output when the first and second light sources provided at the left and right sides of the light guide plate supply the first and second lights to the light guide plate, respectively. The brightness characteristic 78 of the first and second lights represents that the first and second lights are uniformly output from the light guide plate.

As shown in FIG. 13, a horizontal axis represents an exit angle of the first and second lights output from the light guide plate, and a vertical axis represents the brightness of a light output from the light guide plate. In this case, the unit of the exit angle is a degree, and the unit of the brightness is nit. In addition, "0" on the horizontal axis represents that the first and second lights are vertically output from the light exit surface. Positive and negative values on the horizontal axis represent exit angles of the first and second lights based on the light exit surface.

FIG. 13 shows third and fourth brightness characteristics 81 and 83 measured when the first and second lights, which are reflected from the optical path changing portion of the light guide plate, exit through the light exit surface. The optical path changing portion includes the first inclined surface reflecting the first light and the second inclined surface reflecting the second light, in which the first inclined surface and the second inclined surface are inclined at an angle of about 40 degrees with respect to the reflective surface of the light guide plate. The third brightness characteristic 81 shows a superior value at about −30 degrees, and the fourth brightness characteristic 83 shows a superior value at about 30 degrees. In other words, FIG. 13 shows that the first and second lights exit in different directions.

Accordingly, the light guide plate may be adapted to effectively supply the first and second lights to users positioned in different directions. Moreover, the light guide plate may be employed in a display device that displays a three-dimensional image.

Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. A light guide plate comprising:
   a first light incident surface onto which a first external light is incident;
   a second light incident surface onto which a second external light is incident, the second light incident surface being opposite to the first light incident surface;
   a light exit surface that connects the first light incident surface to the second light incident surface to output the first and second external lights;
   a reflective surface configured to reflect the first and second external lights and positioned opposite to the light exit surface; and
   a plurality of optical path changing portions that are provided on the reflective surface at predetermined intervals and recessed toward the light exit surface to reflect the first and second external lights toward the light exit surface,
   wherein the optical path changing portions comprise:
      a first inclined surface having a width that is dependent upon its position relative to the first light incident surface, wherein the width of the first inclined surface increases as a distance from the first light incident surface increases for corresponding ones of the first inclined surfaces; and
      a second inclined surface having a width that is dependent upon its position relative to the second light incident surface, wherein the width of the second inclined surface increases as a distance from the second light incident surface increases for corresponding ones of the second inclined surfaces, and wherein a first end of the second inclined surface is connected to a first end of the first inclined surface, and the first and second inclined surfaces have respective opposite second ends;
   wherein the second ends of the first inclined surfaces are first distances from the light exit surface, wherein the second ends of the second inclined surfaces are second distances from the light exit surface, and wherein the first distances are smaller than the second distances in a first region between the first incident surface and a first reference line extending from a center of the light exit surface perpendicular to the light exit surface, and the second distances are smaller than the first distances in a second region between the first reference line and the second incident surface.

2. The light guide plate of claim 1, wherein the optical path changing portions are provided symmetrically to each other about the first reference line.

3. The light guide plate of claim 2, wherein the first distances are increased in a direction opposite to the first light incident surface, and the second distances are increased in a direction opposite to the second light incident surface.

4. The light guide plate of claim 3, wherein the first inclined surface is inclined at a first angle with respect to the light exit surface, the second inclined surface is inclined at a second angle with respect to the light exit surface, and the first angle is different from the second angle.

5. The light guide plate of claim 2, wherein the first distances are decreased in a direction of the first light incident surface and the second light incident surface on a basis of the first reference line, and the second distances are decreased in a direction of the first light incident surface and the second light incident surface on a basis of the first reference line.

6. The light guide plate of claim 5, wherein the first inclined surface is inclined at a first angle with respect to the light exit surface, the second inclined surface is inclined at a second angle with respect to the light exit surface, and the first angle is equal to the second angle.

7. The light guide plate of claim 2, wherein the first distances are increased in a direction of the first reference line in the first region, the first distances being constant in the second region, and
   the second distances are increased in a direction of the first reference line in the second region, the second distance being constant in the first region.

8. The light guide plate of claim 7, wherein the first inclined surface is inclined at a first angle with respect to the light exit surface, the second inclined surface is inclined at a second angle with respect to the light exit surface, and the first angle is different from the second angle.

9. The light guide plate of claim 2, wherein the first distance is equal to the second distance in the optical path changing portion positioned on the first reference line.

10. The light guide plate of claim 1, wherein the first inclined surface is curved.

11. The light guide plate of claim 10, wherein a tangential line making contact with the first inclined surface forms an angle of about 24 degrees to about 65 degrees with respect to a second reference line parallel to the light exit surface.

12. The light guide plate of claim 1, further comprising a reflective film coated on the reflective surface and a rear surface of the optical path changing portions.

13. A backlight unit comprising:
a first light source that generates a first light;
a second light source that generates a second light; and
a light guide plate that guides and emits the first and second lights,
wherein the light guide plate comprises:
a first light incident surface on which the first light is incident;
a second light incident surface on which the second light is incident, the second light incident surface being opposite to the first light incident surface;
a light exit surface that connects the first light incident surface to the second light incident surface to output the first and second lights;
a reflective surface that reflects the first and second external lights towards the light exit surface; and
a plurality of optical path changing portions provided on the reflective surface at predetermined intervals and recessed toward the light exit surface to reflect the first and second lights toward the light exit surface, and
wherein the optical path changing portions comprise:
a first inclined surface having a width that is dependent upon its position relative to the first light incident surface, wherein the width of the first inclined surface increases as a distance from the first light incident surface increases for corresponding ones of the first inclined surfaces; and
a second inclined surface having a width that is dependent upon its position relative to the second light incident surface, wherein the width of the second inclined surface increases as a distance from the second light incident surface increases for corresponding ones of the second inclined surfaces, and wherein a first end of the second inclined surface is connected to a first end of the first inclined surface, and the first and second inclined surfaces have respective opposite second ends;
wherein the second ends of the first inclined surfaces are first distances from the light exit surface, wherein the second ends of the second inclined surfaces are second distances from the light exit surface, and wherein the first distances are smaller than the second distances in a first region between the first incident surface and a first reference line extending from a center of the light exit surface perpendicular to the light exit surface, and the second distance are smaller than the first distances in a second region between the first reference line and the second incident surface.

14. The backlight unit of claim 13, wherein the optical path changing portions are provided symmetrically to each other about the first reference line.

15. The backlight unit of claim 14, wherein the first distances are increased in a direction opposite to the first light incident surface, and the second distances are increased in a direction opposite to the second light incident surface.

16. The backlight unit of claim 15, wherein the first inclined surface is inclined at a first angle with respect to the light exit surface, the second inclined surface is inclined at a second angle with respect to the light exit surface, and the first angle is different from the second angle.

17. The backlight unit of claim 14, wherein the first distances are decreased in a direction of the first light incident surface and the second light incident surface on a basis of the first reference line, and the second distances are decreased in a direction of the first light incident surface and the second light incident surface on a basis of the first reference line.

18. The backlight unit of claim 17, wherein the first inclined surface is inclined at a first angle with respect to the light exit surface, the second inclined surface is inclined at a second angle with respect to the light exit surface, and the first angle is equal to the second angle.

19. The backlight unit of claim 14, wherein the first distances are increased in a direction of the first reference line in the first region, the first distances being constant in a second region, and
the second distances are increased in a direction of the first reference line in the second region, the second distance being constant in the first region.

20. The backlight unit of claim 19, wherein the first inclined surface is inclined at a first angle with respect to the light exit surface, the second inclined surface is inclined at a second angle with respect to the light exit surface, and the first angle is different from the second angle.

21. The backlight unit of claim 13, wherein the first inclined surface is curved.

22. The backlight unit of claim 13, wherein the first distance is equal to the second distance in the optical path changing portion positioned on the first reference line.

23. A backlight unit comprising:
a first light source that generates a first light;
a second light source that generates a second light; and
a light guide plate that guides and emits the first and second lights,
wherein the light guide plate comprises:
a first light incident surface on which the first light is incident;
a second light incident surface on which the second light is incident, the second light incident surface being opposite to the first light incident surface;
a light exit surface that connects the first light incident surface with the second light incident surface, the light exit surface having a concave-convex shape extending between the first and second light incident surfaces, the light exit surface having a plurality of first inclined surfaces that reflect light, and wherein a width of the first inclined surface increases as a distance from the first incident light surface increases for corresponding ones of the first inclined surfaces; and
a reflective surface that connects the first light incident surface with the second light incident surface in opposition to the light exit surface, the reflective surface having a convex-concave shape extending between the first and second light incident surfaces, the reflective surface having a plurality of second inclined surfaces that reflect light, and wherein a width of the second inclined surface increases as a distance from the second incident light surface increases for corresponding ones of the second inclined surfaces;

wherein the widths of the first inclined surfaces increase from the first light incident surface to the second light incident surface, and the widths of the second inclined surfaces increase from the second light incident surface to the first light incident surface.

24. The backlight unit of claim 23, further comprising a reflective sheet provided below the light guide plate to reflect at least one of the first and second lights emitted from the reflective surface.

* * * * *